United States Patent Office 2,836,505
Patented May 27, 1958

2,836,505

THERMOPLASTIC COMPOSITIONS OF WATER-SOLUBLE CELLULOSE ETHERS

Earle L. Kropscott and George K. Greminger, Jr., Midland, and Miles A. Weaver, Ithaca, Mich., assignors to The Dow Chemical Company, Midland, Mich., a corporation of Delaware No Drawing. Application November 25, 1953
Serial No. 394,506

8 Claims. (Cl. 106—182)

This invention relates to thermoplastic, water-soluble compositions of certain cellulose ethers.

Methods for fabricating useful articles from water-soluble cellulose ethers have been limited to casting and dipping from aqueous solutions. Because of the unique solubility characteristics of those ethers many difficulties arose when it was attempted to use such methods. For example, the temperature of the solution had to remain below the gel point of the cellulose ether during the shaping operation. Another objection was that the amount of cellulose ether in solution had to be restricted, because the viscosity of the solution had to be low enough for casting or dipping operations. A still further objection was the difficulty in dissolving sufficient amounts of the higher viscosity grades of the ethers. Therefore, so that the cellulose ethers may be used in a wider variety of applications for which their properties are ideally suited, it has long been desired to find a thermoplastic water-soluble cellulose ether composition which could be thermally fabricated. One such composition has been disclosed by Silvernail in U. S. Patent 2,602,755. That composition consisted of a water-soluble cellulose ether, propylene glycol, and glycerine in certain stated proportions.

It is an object of this invention to provide water-soluble compositions of cellulose ethers, which compositions are capable of being thermally fabricated.

It has now been found that thermoplastic compositions may be prepared by mixing or blending certain water-soluble cellulose ethers with an alkyl lactate in which the alkyl group contains from 1 to 4 carbon atoms. Although these compositions are especially well adapted for thermal fabrication, they may also be used in conventional casting and dipping operations.

The cellulose ethers that are useful in the compositions of this invention are water-soluble alkyl, hydroxyalkyl, or alkyl hydroxyalkyl cellulose ethers in which the alkyl group may contain from 1 to 3 carbon atoms and in which the hydroxyalkyl group may contain from 2 to 3 carbon atoms. Of particular usefulness are methyl cellulose, hydroxypropyl cellulose, and methylhydroxypropyl cellulose.

It is not critical in the compositions of this invention that the aforementioned ethers exhibit thermoplasticity in themselves. The chief requirement for use in this invention, besides the previously mentioned structural limitations, is water solubility. It is well-known that methyl cellulose, and other cellulose ethers which are soluble in aqueous media, differ in their solubility properties depending on the extent to which they are etherified. The least etherified products are soluble only in dilute alkaline media, and often only at low temperatures. The somewhat more highly etherified materials are soluble in water. In a few cases the fully etherified compounds become insoluble in water and are soluble only in organic solvents. Also, certain alkyl hydroxyalkyl cellulose ethers, such as those described in our copending application Serial No. 394,484, filed November 25, 1953, are soluble in both aqueous and organic media.

Any of the commercially available viscosity grades of these cellulose ethers may be employed. The viscosity grade used will depend chiefly on the properties desired in the fabricated article and on other practical considerations such as the length of time required to blend the ethers with the plasticizer. The higher the intrinsic viscosity of the cellulose ether, the less fluid will be the composition and the longer will be the time required to mix in the plasticizer.

As previously mentioned, the useful plasticizer for the compositions of this invention are alkyl lactates in which the alkyl group contains from 1 to 4 carbon atoms. When the alkyl groups contain five or more carbon atoms, the solvent power of the alkyl lactate is decreased to the point where they no longer are useful as plasticizers. Other known plasticizers for cellulose ethers may be used in conjunction with the alkyl lactates of this invention. As examples of such plasticizers may be mentioned propylene glycol, the esters of glycollic acid, and acetyl tributyl citrate. Their use is not essential, however, in preparing the thermoplastic compositions.

The amount of plasticizer that may be employed in the compositions may vary within wide limits between 20 and 95 percent, preferably from 20 to 85 percent. The amount that is used in any particular composition will depend on the viscosity grade of the cellulose derivative, and on the intended use of the composition. It should be obvious that when the very high viscosity grades of cellulose ethers (4000 centipoises or higher) are used, high concentrations of the cellulose ether are impractical because the resulting solutions are so viscous that they cannot be easily worked. Also, the fluidity of the plasticized composition that is necessary varies with the type of fabricating operation. For casting and dipping operations, the solutions must have greater fluidity than with most thermal operations, such as injection molding or extrusion. When reference is made herein to the viscosity grade of the cellulose ether, this is the viscosity in centipoises of a 2 percent solution of that ether by weight in water at 20° C.

The compositions of the invention will be further defined by the following illustrative examples.

*Example 1*

A composition was prepared consisting of 20 parts by weight of a water-soluble methyl hydroxypropyl cellulose (100 cps. viscosity grade) and 80 parts by weight of ethyl lactate. The mixture was heated to 140° C. with agitation to effect solution. The resulting composition was uniformly clear with no evidence of gels.

When the above composition was subjected to extrusion conditions, a clear, flexible strip was obtained.

In a like manner similar compositions were prepared using propyl and butyl lactates in place of the ethyl lactate. These compositions could be extruded to produce clear and flexible strips or sheets.

*Example 2*

Compositions were prepared consisting of 50 parts by weight of a water-soluble methyl cellulose (50 cps. viscosity grade) and 35 parts by weight of ethyl lactate and 15 parts by weight of acetyl tributyl citrate. The mixture was heated to 120° C. with agitation to effect solution. The resulting composition formed clear strips when subjected to thermal extrusion conditions. The strips were placed in a cavity type die and pharmaceutical capsules prepared by vacuum drawing the strips into the molds. The capsules produced were comparable to the common gelatin capsules.

Example 3

A composition consisting of 15 parts by weight of a water-soluble hydroxyethyl cellulose, 45 parts by weight of isobutyl lactate, and 40 parts by weight of propylene glycol was prepared. Capsules were prepared by dipping brass pins into the solution which was heated to 140° C. to obtain the required dipping fluidity. The capsules were then cooled and stripped from the pins. They were tough, and were readily soluble in water, and were deemed to be superior to the common gelatin capsules.

We claim:

1. A thermoplastic composition consisting essentially of from 5 to 80 percent of a water-soluble cellulose ether selected from the group of alkyl cellulose, hydroxyalkyl cellulose, and alkyl hydroxyalkyl cellulose in which the alkyl group contains from 1 to 3 carbon atoms and the hydroxyalkyl group contains from 2 to 3 carbon atoms, and correspondingly from 95 to 20 percent of an alkyl lactate in which the alkyl group contains from 1 to 4 carbon atoms as a permanent plasticizer for said water-soluble cellulose ether.

2. The composition claimed in claim 1, wherein the cellulose ether is a water-soluble methyl cellulose.

3. The composition claimed in claim 1, wherein the cellulose ether is a water-soluble methyl hydroxypropyl cellulose.

4. The composition claimed in claim 1, wherein the cellulose ether is a water-soluble hydroxyethyl cellulose.

5. The composition claimed in claim 1, wherein the alkyl lacetate is ethyl lactate.

6. The composition claimed in claim 1, wherein the alkyl lactate is propyl lactate.

7. The composition claimed in claim 1, wherein the alkyl lactate is butyl lactate.

8. The composition claimed in claim 1, wherein the alkyl lactate is isobutyl lactate.

References Cited in the file of this patent

Bock: Jour. Ind. & Eng. Chem., vol. 29, pp. 985–7, 1937.

Hercules: Ethyl Cellulose, Hercules Powder Co., pp. 18, 19, 22, 1949.